Feb. 21, 1950   J. KREISLER   2,498,211
BRACELET AND METHOD OF MAKING THE SAME
Filed Jan. 27, 1947   4 Sheets-Sheet 1
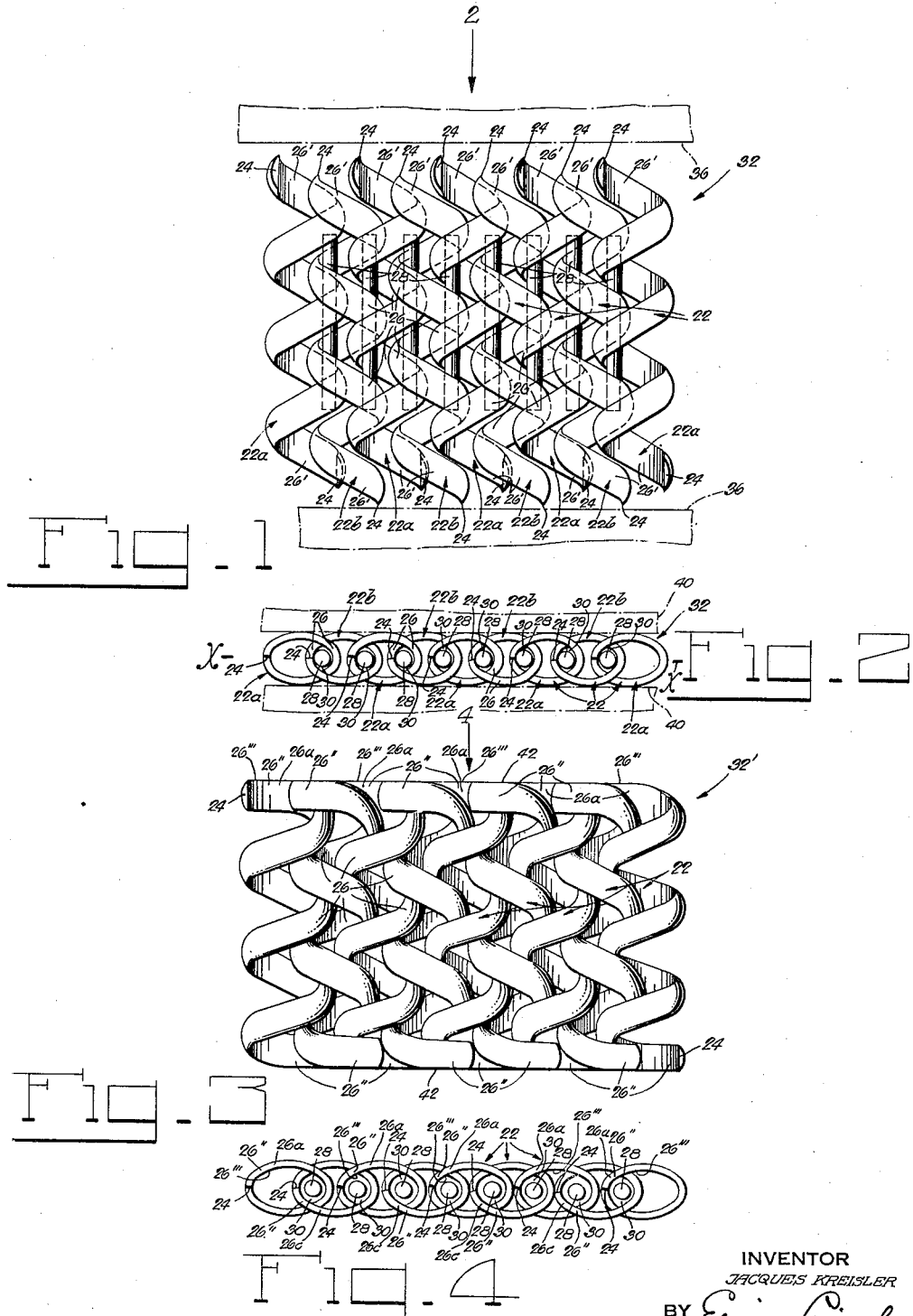
INVENTOR
JACQUES KREISLER
BY Edwin Leusohn
ATTORNEY Feb. 21, 1950 J. KREISLER 2,498,211
BRACELET AND METHOD OF MAKING THE SAME
Filed Jan. 27, 1947 4 Sheets-Sheet 2
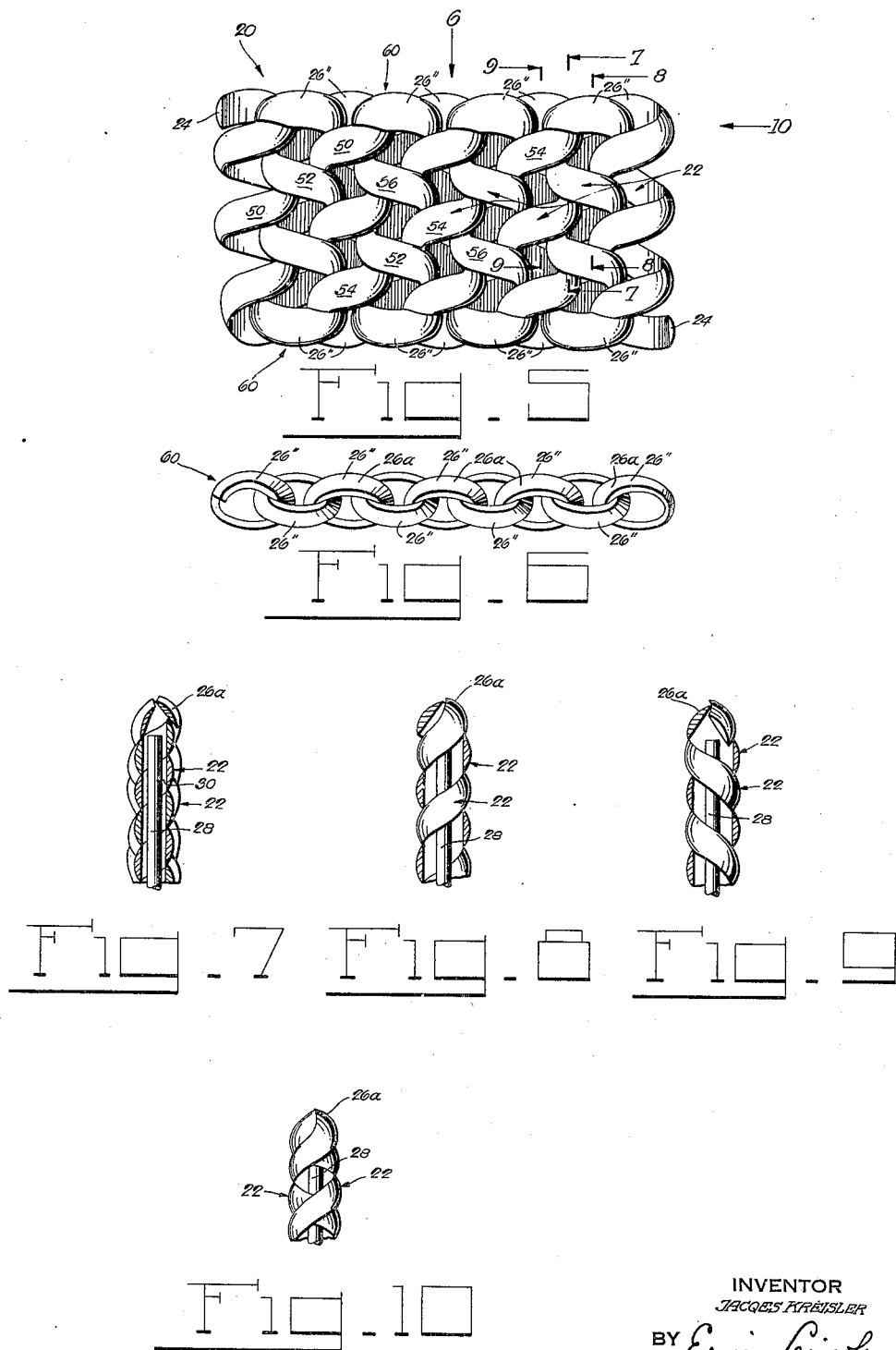
INVENTOR
JACQUES KREISLER
BY Edwin Leisohn
ATTORNEY

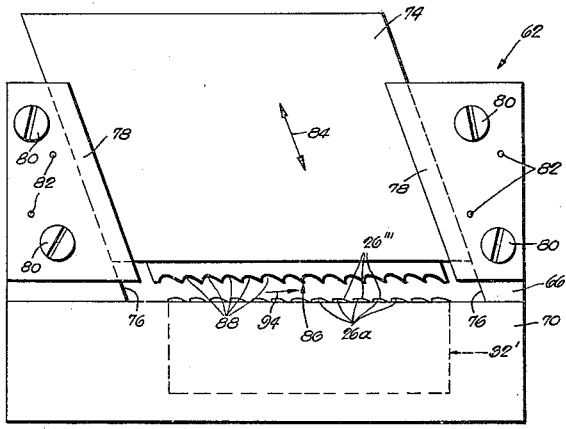
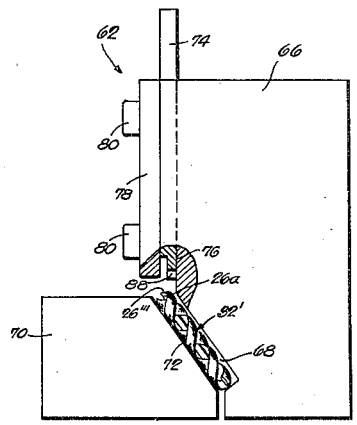
Fig.11     Fig.12
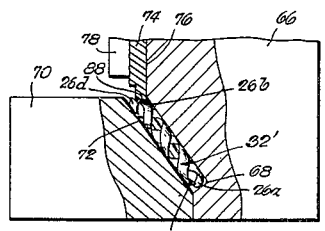
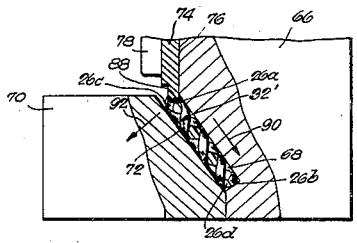
Fig.14     Fig.13
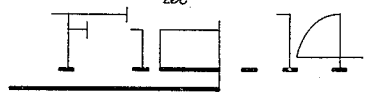
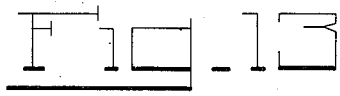
Fig.16
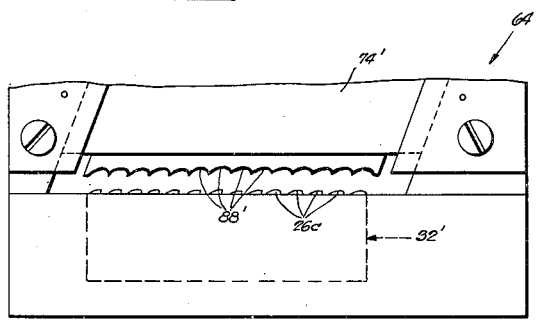
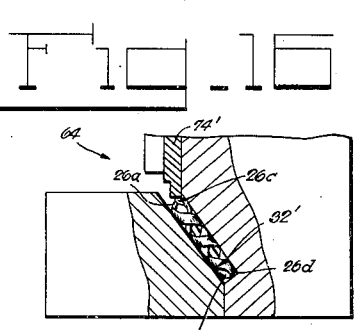
Fig.15
INVENTOR
JACQUES KREISLER
BY
ATTORNEY Feb. 21, 1950 J. KREISLER 2,498,211
BRACELET AND METHOD OF MAKING THE SAME
Filed Jan. 27, 1947 4 Sheets-Sheet 4

INVENTOR
JACQUES KREISLER
BY Edwin Leusohr
ATTORNEY

Patented Feb. 21, 1950

2,498,211

UNITED STATES PATENT OFFICE 2,498,211

BRACELET AND METHOD OF MAKING THE SAME

Jacques Kreisler, New Rochelle, N. Y., assignor to Jacques Kreisler Manufacturing Corporation, North Bergen, N. J., a corporation Application January 27, 1947, Serial No. 724,655

8 Claims. (Cl. 59—80)

This invention relates to bracelets or the like, and more particularly to bracelets for wrist watches and to a method of making the same.

The type of bracelet to which the present invention relates is shown and described in a co-pending application of Leslie Kreisler, Serial Number 673,691, filed May 31, 1946, now Patent 2,451,249, dated October 19, 1948. The bracelet there disclosed is fabricated from individual spiral elements of which alternate elements of oppositely directed or wound convolutions are intermeshed and held together as an assembly by inserted pins. The assembly of elements is then finished into bracelet form by compressing the same edgewise, thereby forcing the intermeshed convolutions of the elements into interlocking relation with each other and lending to the bracelet the pleasing appearance of obliquely interwoven, continuous bands, rather than individually joined links. However, the side edges of the bracelet thus formed either have an unfinished appearance, or the ends of the pivot pins protrude from the edges of the bracelet and are headed, suggesting by their conspicuous presence the use of individually joined links which the bracelet so cleverly conceals otherwise.

It is the primary aim and object of the present invention to form the side edges of a bracelet of the above type so that they completely hide the ends of the inserted pins and have a finished and pleasant appearance harmonizing with the design of the rest of the bracelet.

It is another important object of the present invention to devise a method of thus forming the side edges of a bracelet of this type efficiently and at little cost.

The above and other objects, features and advantages of the present invention will be more fully understood from the following description considered in connection with the accompanying illustrative drawings.

In the drawings:

Fig. 1 shows greatly enlarged individual elements from which a bracelet is fabricated, and as they are coordinated prior to their formation into bracelet form;

Fig. 2 is an edge view of the coordinated elements as viewed in the direction of the arrow 2 in Fig. 1;

Fig. 3 is a fragmentary elevational view of the bracelet in one of its formative stages;

Fig. 4 is a fragmentary, edge view of the partly formed bracelet as viewed in the direction of the arrow 4 in Fig. 3;

Fig. 5 is a fragmentary elevational view of the finished bracelet;

Fig. 6 is a fragmentary edge view of the finished bracelet as viewed in the direction of the arrow 6 in Fig. 5;

Figure 17:
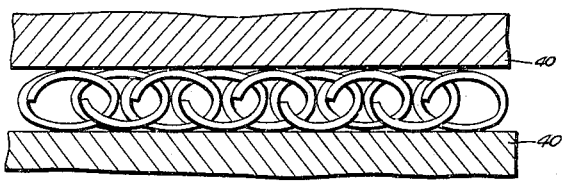
Figure 18:
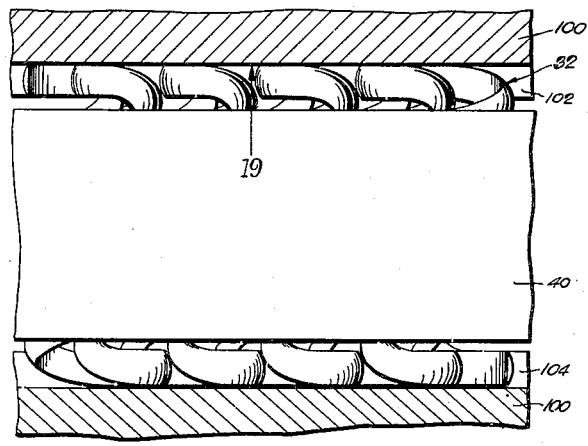
Figure 19:
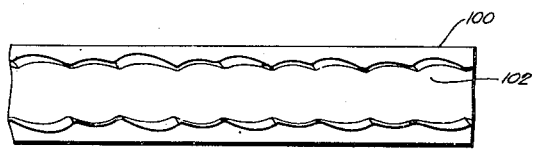

Figs. 7, 8 and 9 are fragmentary cross sections through the finished bracelet, taken substantially on the lines 7—7, 8—8, and 9—9, respectively, of Fig. 5;

Fig. 10 is a fragmentary and elevation of the finished bracelet as viewed in the direction of the arrow 10 in Fig. 5;

Fig. 11 is a front elevation of a device employed in the formation of the bracelet;

Fig. 12 is a side elevation, partly in section, of the same device;

Figs. 13 and 14 are fragmentary side elevations, partly in section, of the same device, showing the same in the performance of its functions;

Fig. 15 is a fragmentary front elevation of a similar device also employed in the formation of the bracelet;

Fig. 16 is a fragmentary side elevation, partly in section, of the device shown in Fig. 15;

Fig. 17 is a fragmentary edge view of the bracelet in an intermediate stage of its formation after subjection to a modified operation;

Fig. 18 is a longitudinal section, partly in elevation, through structure by which the modified intermediate formation of the side edges of the bracelet shown in Fig. 17 is accomplished; and Fig. 19 is a fragmentary edge view of one of the forming elements of the structure in Fig. 18, as viewed in the direction of the arrow 19 in Fig. 18.

Referring to the drawings, and particularly to Fig. 5, the reference numeral 20 designates a finished bracelet which is fabricated from individual elements or links 22 (Figs. 1 and 2). The links 22 are in the form of spirals made preferably from flat, or relatively flat, metal stock. In the present instance, the spiral links 22 are made from half-round stock as clearly shown in Figs. 1 and 7 to 9, inclusive. The links 22 are of two types, namely, oppositely directed or wound spirals 22a and 22b (Figs. 1 and 2) which are used alternately in the fabrication of the bracelet for a reason which will become clear hereinafter.

In fabricating the bracelet, as many links 22 as are required therefor are initially assembled by intermeshing the convolutions 26 of alternate links 22a and 22b in the fashion shown in Figs. 1 and 2, and inserting pins 28 into the openings 30 provided by the intermeshed convolutions of adjacent links 22, in order to hold the links in the intermeshed relation shown in Fig. 2. The intermeshed links 22 and inserted pins 28 (Fig. 1) are hereafter referred to as the "link assembly" 32. For a purpose which will become evident hereinafter, the ends 24 of the adjacent end convolutions 26' of adjacent links 22 in the assembly 32 face each other and are disposed substantially in the median plane X—X of the assembly 32 in which the longitudinal axes of the elements 22 lie (Fig. 2).

The link assembly 32 is next placed between rams 36 (shown in dot-and-dash lines in Fig. 1) which are relatively movable to and from each other. On relative movement of the rams 36 toward each other, the spiral links 22 of the assembly 32 are axially compressed, whereby their intermeshed convolutions 26 are forced into interlocking relation with each other (Fig. 3). In order to prevent expansion of the links 22 laterally of the assembly 32 during their compression by the rams 36, the link assembly 32 is placed between opposite, non-yielding retainer platens 40 shown in dot-and-dash lines in Fig. 2.

The link assembly 32 is, contrary to the procedure outlined in said copending application of Leslie Kreisler, only initially, and not finally, compressed edgewise by the rams 36, leaving it at this stage of its formation (Fig. 3) of greater width than the finished bracelet 20. In initially compressing the link assembly 32 by the relatively movable rams 36, the intermeshed convolutions 26 of the links 22 are interlocked as described, and the non-meshed end portions of the end convolutions 26' of the links 22 are also forced inwardly axially of the links 22 so as to define approximately straight edges 42 on the compressed link assembly 32' (Fig. 3). Also, in initially compressing the link assembly 32 as described, the same is elongated longitudinally, as follows clearly from a comparison between Figs. 2 and 4. The longitudinal elongation of the link assembly is due to the fact that the links 22 thereof are prevented from expanding transversely of the assembly by the retainer platens 40 (Fig. 2) when the assembly is initially compressed by the rams 36. By preventing expansion of the links 22 transversely of the assembly, several important advantages are secured. Thus, the thickness of the bracelet will be kept within narrow limits and it may have a slender appearance, while longitudinal expansion of the link assembly in consequence of its initial compression enhances the pleasant appearance of obliquely interwoven, continuous bands 50, 52, 54 and 56, for instance, in the finished bracelet (Fig. 5).

As shown in Fig. 2, the links 22 from which the bracelet is fabricated are, in the present instance, oval or generally oblong, rather than round, in shape, securing the advantage that more nearly cylindrical openings 30 of maximum cross-sectional area are provided between the intermeshed convolutions 26 of adjacent links 22 (Fig. 2) for the reception of strong pins 28. The oblong shape of the links 22 also permits the use of relatively strong links in a bracelet which appears slender nevertheless.

The side edges 42 of the compressed link assembly 32' are next formed into the finished state shown at 60 in Figs. 5 and 6. To this end, the non-meshed portions 26" of the adjacent end convolutions 26' of the links 22 in the assembly 32' are displaced or twisted from their normal spiral disposition (Fig. 4) into the intertwisted relation shown in Figs. 6 to 10, inclusive, in which they conceal each other's ends 24, and thus leave no indication on the finished bracelet that it is fabricated from individual spiral links 22. This becomes particularly apparent in Fig. 6, in which the intertwisted end portions 26" of the links 22 roughly simulate a continuous sinuous band, and thus carry to successful conclusion the deception of obliquely interwoven continuous bands in the bracelet (Fig. 5).

The described formation of the edges 60 of the bracelet is accomplished, in the present instance, by devices 62 and 64 (Figs. 11 and 15). The device 62 comprises an upright member 66, having an inclined recess 68 for the reception of a compressed link assembly 32', and a companion member 70 which is movable in any suitable manner to and from engagement with member 66 (Figs. 12 and 13) and has an inclined surface 72 against which rests the inserted link assembly 32' in the recess 68 in the member 66. Thus, the recess 68 in member 66 and the surface 72 of member 70 serve as a holder in which a link assembly 32' may readily be inserted, and which, when member 70 is closed, laterally confines the inserted assembly 32" to an extent preventing lateral expansion of said assembly, but permitting further edgewise compression of the same. A ram 74 is slidable for movement in a vertical plane in guideways 76 in the member 66, and is retained therein by gibs 78 which are suitably secured to the member 66 by screws 80 and accurately located thereon by dowel pins 82. The ram 74 is guided for movement in a vertical plane and in the inclined direction indicated by the arrows 84 in Fig. 11, and the bottom or working edge of the ram is serrated as at 86, each serration being in the form of, and serving as, a curved die surface 88 with which to form or twist the aligned, non-meshed end portion 26" of the adjacent link 22 in the inserted assembly 32'. More particularly, the die surfaces 88 of the ram 74 form, in one work stroke of the latter, the adjacent non-meshed end portions 26a of the links 22 which are on the same side of the inserted assembly 32' (Figs. 4 and 11 to 13, inclusive). Each die surface 88 engages the outermost edge 26''' of the aligned end portion 26a of the adjacent link 22 in the inserted assembly and exerts thereagainst a force which, due to the relative inclination of the ram 74 and inserted assembly 32' (Fig. 12) and the inclined path of movement of the ram 74 with respect to the inserted assembly 32' (Fig. 18), has on the aligned end portion 26a of the adjacent link 22 the effect of three component forces directed edgewise of the assembly 32' in the direction of the arrow 90 (Fig. 13), widthwise of the assembly 32' in the direction of the arrow 92 (Fig. 13), and longitudinally of the assembly 32' in the direction of the arrow 94 (Fig. 11). These component forces cooperate to twist or form the end portion 26a of each link 22 on the assembly 32' into the obliquely curved, final disposition shown in Figs. 6 to 10, inclusive, while the component forces directed edgewise of the assembly 32' in the direction of the arrow 90 in Fig. 13 further compress said assembly edgewise.

The assembly 32' is, after the formation of the first end portions 26a of the links 22 thereof, removed from the device 62 and reinserted therein in inverted position (Fig. 14), bringing the end portions 26b of the links 22 into operative alignment with the die surfaces 88 on the ram 74. The end portions 26b, which in the case of the present spiral elements 22 are on the same side of the assembly 32' as the formed end portions 26a, are then in the same relation to the die surfaces 88 as the latter end portions were for their formation by these die surfaces, and are formed into their final shape by the descending ram 74.

Inasmuch as the remaining end portions 26c and 26d of the links 22 on the other side of the assembly 32' proceed oppositely to the end portions 26a and 26b of these links (Figs. 4 and 15), recourse is had for their final formation to the device 64 which is in every respect like the device 62 in Fig. 11, except that he ram 74' is guided for movement in a different inclined path, so that the die surfaces 88' thereof assume the same relation to the end portions 26c and 26d, respectively, of the links 22 which the die surfaces 88 assume to the other end portions 26a and 26b of said links. Since in each of the four instances of forming the non-meshed end portions of the links of the assembly in the devices 62 and 64, the assembly 32' is progressively further compressed edgewise as explained, it stands to reason that the finished bracelet 20 is of less width than the compressed assembly 32', whereby the previously mentioned advantages springing from the initial compression of this assembly are even enhanced by the further compression thereof during the formation of its opposite side edges.

Instead of using the plane-faced rams 36 (Fig. 1) for the initial compression of the link assembly 32, recourse may be had to the rams 100 (Figs. 18 and 19) which have die grooves 102 and 104, respectively, that are so shaped as slightly to bend the adjacent non-meshed end portions of the links 22 of the assembly inwardly (Fig. 17) as the latter is being compressed, and thereby starting these non-meshed end portions on their displacement into final shape. The rams 100 with their forming grooves 102 and 104 may also be used as mere dies for slightly inwardly bending the adjacent non-meshed end portions of the links 22 of the assembly 32 (Fig. 17) on closing the rams on the latter, whereby the assembly is only incidentally compressed edgewise to an extent falling short of the desired initial compression of the same (Fig. 3). The assembly may thereafter be subjected to the action of plane-faced rams, such as the rams 36 in Fig. 1, in order to force the assembly into the initially compressed state shown in Fig. 3. The hereinbefore described edge formation on a bracelet of the type shown and described in the beforementioned application of Leslie Kreisler, Ser. No. 673,691, now Patent 2,451,749, dated October 19, 1948, may obviously be undertaken also on a bracelet of the type shown and described in a co-pending application of Leslie Kreisler and John G. Siska, Ser. No. 692,617, filed August 23, 1946, now Patent 2,451,750, dated October 19, 1948. This latter bracelet differs from the former bracelet only in that it has no pins for holding the adjacent spiral elements in intermeshed relation, instead these elements are securely held in intermeshed relation solely by their interlocked convolutions.

While I have shown and described the preferred embodiment of my invention, it will be understood that various changes in the details of construction and in the method may be made without departing from the underlying idea or principles of the invention within the scope of the appended claims.

Having thus described my invention, what I claim and desire to secure by Letters Patent is:

1. A bracelet band, comprising a series of laterally extending alternate, oppositely directed spiral elements with their convolutions in meshed relation, the intermeshed convolutions of adjacent elements being at each of their intersections mutually deformed into mutual limited interlocked relation to prevent substantial relative movement between said adjacent elements, other than limited pivotal relative movement therebetween about axes parallel to their longitudinal axes, adjacent end convolutions of successive elements having curved portions, respectively, disposed alternately on opposite sides of the band, and each of said curved portions being inclined relative to the median plane of the band toward the opposite side of the band and having an end portion disposed within and concealed by the curved and inclined end portion of the adjacent end convolution of the adjacent element.

2. A bracelet band, comprising an assembly of laterally extending alternate, oppositely directed spiral elements with their convolutions in meshed relation, the intermeshed convolutions of adjacent elements being at each of their intersections mutually deformed into mutual limited interlocked relation to prevent substantial relative movement between said adjacent elements, other than limited pivotal relative movement therebetween about axes parallel to their longitudinal axes, the adjacent ends of successive elements being alternately on opposite sides of the assembly and the end of each element along each side edge of the assembly being obliquely curved inwardly into the adjacent end of the adjacent element so that said ends together simulate a continuous sinuous band along each side edge of the assembly.

3. A bracelet band, comprising an assembly of laterally extending alternate, oppositely directed spiral elements with their convolutions in meshed relation with each other, and pins inserted in the intermeshed convolutions of adjacent elements, respectively, for positively holding said elements in said relation, the adjacent ends of successive elements being alternately on opposite sides of the assembly and the end of each element along each side edge of the assembly being obliquely curved inwardly into the adjacent end of the adjacent element so that said ends together simulate a continuous sinuous band along each side edge of the assembly.

4. A bracelet band, comprising an assembly of laterally extending alternate, oppositely directed spiral elements with their convolutions in meshed relation, the intermeshed convolutions of adjacent elements being at each of their intersections mutually deformed into mutual limited interlocked relation to prevent substantial relative movement between said adjacent elements, other than limited pivotal relative movement therebetween about axes parallel to their longitudinal axes, each element being formed of substantially flat stock disposed width-wise substantially parallel to the longitudinal axis of said element, the non-meshed end portions of adjacent end convolutions of successive elements being alternately disposed on opposite sides, respectively, of the assembly and the non-meshed end portion of each element along each side edge of the assembly being obliquely curved inwardly into the adjacent non-meshed end portion of the adjacent element so that said end portions together simulate a continuous sinuous band along each side edge of the assembly.

5. A bracelet band, comprising a series of laterally extending alternate, oppositely directed spiral elements with their convolutions in meshed relation, and pins inserted in the intermeshed convolutions of adjacent elements, respectively, said pins terminating short of the adjacent end convolutions of the intermeshed elements, the adjacent ends of successive elements being alternately on opposite sides of the assembly and the end of each element along each side edge of the assembly being obliquely curved inwardly into the adjacent end of the adjacent element so that said ends together simulate a continuous sinuous band edgewise of the assembly and conceal the adjacent ends of the inserted pins.

6. In a method of making a bracelet band according to which a series of laterally extending alternate, oppositely directed spiral elements are arranged in an assembly with their convolutions in meshed relation and the adjacent non-meshed end portions of successive elements alternately disposed on opposite sides, respectively, of the assembly, and pins are inserted into the intermeshed convolutions of adjacent elements, respectively, and terminate short of the adjacent end convolutions thereof, that improvement which comprises compressing the assembly axially of the elements thereof to straighten the side edges of the assembly, and pressing the adjacent non-meshed end portions of successive elements, respectively, at either side edge of the assembly toward the median plane, and toward the opposite side edge, of the assembly and into each other to conceal each other's ends and also the adjacent ends of the inserted pins.

7. In a method of making a bracelet band according to which a series of laterally extending, alternate, oppositely directed spiral elements are arranged in an assembly with their convolutions in meshed relation, the adjacent non-meshed end portions of successive elements are alternately disposed on opposite sides, respectively, of the assembly, and pins are inserted into the intermeshed convolutions of adjacent elements, respectively, and terminate short of the adjacent end convolutions thereof, that improvement which comprises forcing each non-meshed end portion of each element of the assembly in a direction resultant from three component directions toward the opposite side of the assembly, toward the opposite side edge of the asembly and longitudinally of the assembly, respectively, thereby to conceal the ends of adjacent non-meshed end portions of successive elements within each other and also to conceal the ends of the inserted pins by the adjacent non-meshed end portions of adjacent elements.

8. Method of finishing the opposite side edges of a bracelet band having a series of laterally extending alternate, oppositely directed spiral elements arranged in an assembly with their convolutions in meshed relation, the adjacent non-meshed end portions of successive elements being alternately disposed on opposite sides, respectively, of the assembly, and pins being inserted into the intermeshed convolutions of adjacent elements, respectively, and terminating short of the adjacent end convolutions thereof, comprising curving the non-meshed end portion of each element along each side edge of the assembly obliquely inwardly into the adjacent non-meshed end portion of the adjacent element so that said end portions together simulate a continuous sinuous band along each side edge of the assembly and conceal the adjacent ends of the inserted pins.

JACQUES KREISLER.

REFERENCES CITED

The following references are of record in the file of this patent:

UNITED STATES PATENTS

| Number | Name | Date |
|---|---|---|
| 155,941 | Grant | Oct. 13, 1874 |
| 298,432 | Vester | May 13, 1884 |
| 398,427 | Midgley | Feb. 26, 1889 |
| 728,827 | Anthony | May 26, 1903 |
| 1,784,254 | Schofer | Dec. 9, 1930 |
| 1,790,464 | DuBois | Jan. 27, 1931 |